(12) United States Patent  (10) Patent No.: US 7,778,435 B2
Smith et al.  (45) Date of Patent: Aug. 17, 2010

(54) ERGONOMIC EARPIECE

(75) Inventors: Richard C. Smith, Costa Mesa, CA (US); Diann Y. Smith, Costa Mesa, CA (US)

(73) Assignee: SureFire, LLC, Fountain Valley, CA (US)

( * ) Notice: Subject to any disclaimer, the term of this patent is extended or adjusted under 35 U.S.C. 154(b) by 1119 days.

(21) Appl. No.: 11/236,969

(22) Filed: Sep. 27, 2005

(65) Prior Publication Data

US 2006/0067524 A1  Mar. 30, 2006

Related U.S. Application Data

(60) Provisional application No. 60/613,742, filed on Sep. 27, 2004.

(51) Int. Cl.
*H04R 25/00* (2006.01)
*A61B 7/02* (2006.01)

(52) U.S. Cl. ................... 381/380; 381/328; 181/135; D14/205; 455/575.2

(58) Field of Classification Search ............... 181/129, 181/135, 130; 381/328, 380, 382; D14/205, D14/223, 249; 379/174, 430; 455/575.2
See application file for complete search history.

(56) References Cited

U.S. PATENT DOCUMENTS

| | | | | |
|---|---|---|---|---|
| 1,668,890 A * | 5/1928 | Curran et al. | ................ | 381/380 |
| 1,753,817 A * | 4/1930 | Aber | ........................ | 381/380 |
| 4,020,297 A * | 4/1977 | Brodie | ..................... | D14/205 |
| 4,443,668 A * | 4/1984 | Warren | ...................... | 381/380 |
| 5,677,964 A * | 10/1997 | Sun | ........................... | 381/385 |
| 2003/0091210 A1 * | 5/2003 | Baskerville | ................ | 381/380 |
| 2003/0174853 A1 * | 9/2003 | Howes et al. | .............. | 381/370 |

* cited by examiner

*Primary Examiner*—Curtis Kuntz
*Assistant Examiner*—Jesse A Elbin
(74) *Attorney, Agent, or Firm*—Haynes and Boone LLP

(57) ABSTRACT

An earpiece that substantially lacks a lower lobe is disclosed. The earpiece has a generally arcuate rib having upper and lower ends. A generally vertical rib extends substantially between the upper and lower ends of the generally arcuate rib. A lobe is formed at the upper end of the arcuate rib. No lobe is similarly formed at the lower end of the arcuate rib. Eliminating the lower lobe mitigates discomfort during use and also reduces the likelihood of tissue damage and infection.

29 Claims, 4 Drawing Sheets

ERGONOMIC EARPIECE

PRIORITY CLAIM

This patent application claims the benefit of the priority date of U.S. provisional patent application Ser. No. 60/613,742, filed on Sep. 27, 2004 and entitled EARPIECE WITHOUT LOWER LOBE pursuant to 35 USC 119. The entire contents of this provisional patent application are hereby expressly incorporated by reference.

TECHNICAL FIELD

The present invention relates generally to earpieces used by security, law enforcement, and military personnel to facilitate listening to two-way radios. The present invention relates more particularly to an ergonomic earpiece that has a smooth bend instead of the lower lobe of contemporary earpieces, so as to enhance fit and comfort.

BACKGROUND

Earpieces for use by security, law enforcement, and military personnel are well known. Such earpieces fit into the conchae bowl of the ear and facilitate listening to two-way radios and the like. Typically, these earpieces have a short length of coiled acoustic tubing attached thereto. A speaker at one end of the acoustic tubing, transmits sound through the acoustic tubing to the eardrum. The speaker has an electrical cable that connects it to the two-way radio.

Such contemporary earpieces typically comprise a generally arcuate rib connected to a generally vertical rib so as to define a D shape. A top lobe is formed at the top, near where the arcuate rib and the generally vertical rib intersect. Similarly, a bottom lobe is formed at the bottom, near where the arcuate rib and the generally vertical rib intersect.

In many instances, when the arcuate rib is too large for the conchae, the arcuate rib bends and forces the lower lobe against the ear. The lower lobe can rub the ear, causing pain and sometimes even tissue damage and/or infection. That is, if an earpiece is used that is too large for the ear, then the generally arcuate rib can collapse as the oversized earpiece is forced into the ear. When the generally arcuate rib collapses, then the lower lobe can torque, twist, bend or otherwise move or deform in a manner that can cause discomfort, pain, and/or tissue damage, particularly with prolonged usage.

Moreover, the discomfort caused by such contemporary earpieces can be a substantial disadvantage. Not only can the discomfort be a motivation for removing the earpiece, but it can be a dangerous distraction. Because of the discomfort, a wearer can be caused to consciously or unconsciously manipulate the earpiece. That is, the wearer may move the earpiece in an attempt to relieve the discomfort that it causes. In doing this, the wearer can be distracted. As those skilled in the art will appreciate, such a distraction can be very dangerous to security, law enforcement, and military personnel. Many times, it is important that such people give there full attention to their environment, since their life may very well depend upon their ability to do so. Any distraction can have severe consequences.

Thus, although such contemporary earpieces have proved generally suitable for their intended purpose, they do have characteristics that tend to detract from their overall effectiveness and desirability. Moreover, is desirable to provide an earpiece that does not rub the ear, even when the arcuate rib bends substantially because the arcuate rib is too large for the ear.

BRIEF SUMMARY

An earpiece substantially lacking a lower lobe is disclosed. The earpiece can have a smooth bend instead of the lower lobe of contemporary earpieces. That is, the lower lobe can be either completely or partially absent. In this manner, disadvantages associated with the lower lobe can be mitigated, while still providing an earpiece that functions as desired.

More particularly, the earpiece can comprise a generally arcuate rib having upper and lower ends, a generally vertical rib extending substantially between the upper and lower ends, and a lobe formed at the upper end of the arcuate rib. A smooth bend can be formed at the lower end of the arcuate rib (where the lower lobe is in contemporary earpieces). The earpiece can be configured to be generally shaped like a D.

The earpiece can further comprise a protrusion or stem having a bore formed therethrough, the protrusion being configured to extend at least partially into the ear canal. The bore can transmit sound, such as from a two-way radio, to the wearer's eardrum.

The earpiece can be formed of a resilient polymer. For example, the earpiece can be formed of a resilient polymer having a Shore A durometer of between 35 and 45. More particularly, the earpiece can be formed of a resilient polymer having a Shore A durometer of approximately 40.

The earpiece can be configured to be captured by protrusions of the conchae. For example, the earpiece can be configured to be captured at least partially by the antihelix of the ear and/or by other anatomical structures of the ear.

The generally arcuate rib can bend to accommodate a wide range of ear sizes. More particularly, the generally arcuate rib can collapse so as to accommodate a range of ear sizes. Thus, the earpiece can deform so as to facilitate the use of a single size thereof with ear's (particular the conchae bowls and proximate anatomical structures) that have a wide range of sizes.

One embodiment of the earpiece can be configured to fit at least extra large sized ears. Similarly, one embodiment of the earpiece can be configured to fit at least extra large sized ears and large sized ears. Moreover, a single size of the earpiece can configured to fit most adult ears. For example, the earpiece can be configured to fit at least 70% of ears of men between 19 and 40 years old. Bending of the vertical rib and lack of the lower lobe cooperate to facilitate the fitting of such a large range of sizes.

According to one embodiment, the present invention comprises a portable communication system comprising a radio and also comprising an earpiece having a smooth bend instead of a lower lobe. The present invention can similarly be used with cellular telephones, MP3 players, and the like.

According to one embodiment, the present invention comprises a method for using an earpiece wherein the method comprises inserting an earpiece into the conchae of an ear, the earpiece having a generally arcuate rib that is sized such that it deforms when the earpiece is inserted into the ear, deformation of the earpiece not causing a lobe of the earpiece to give discomfort to the wearer.

The earpiece of the present invention enhances comfort during use by eliminating or substantially reducing the lower lobe. Thus, a potential source of discomfort, irritation, pain, tissue damage and even infection is mitigated.

This invention will be more fully understood in conjunction with the following detailed description taken together with the following drawings.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION OF THE PREFERRED EMBODIMENTS

Figure 1:
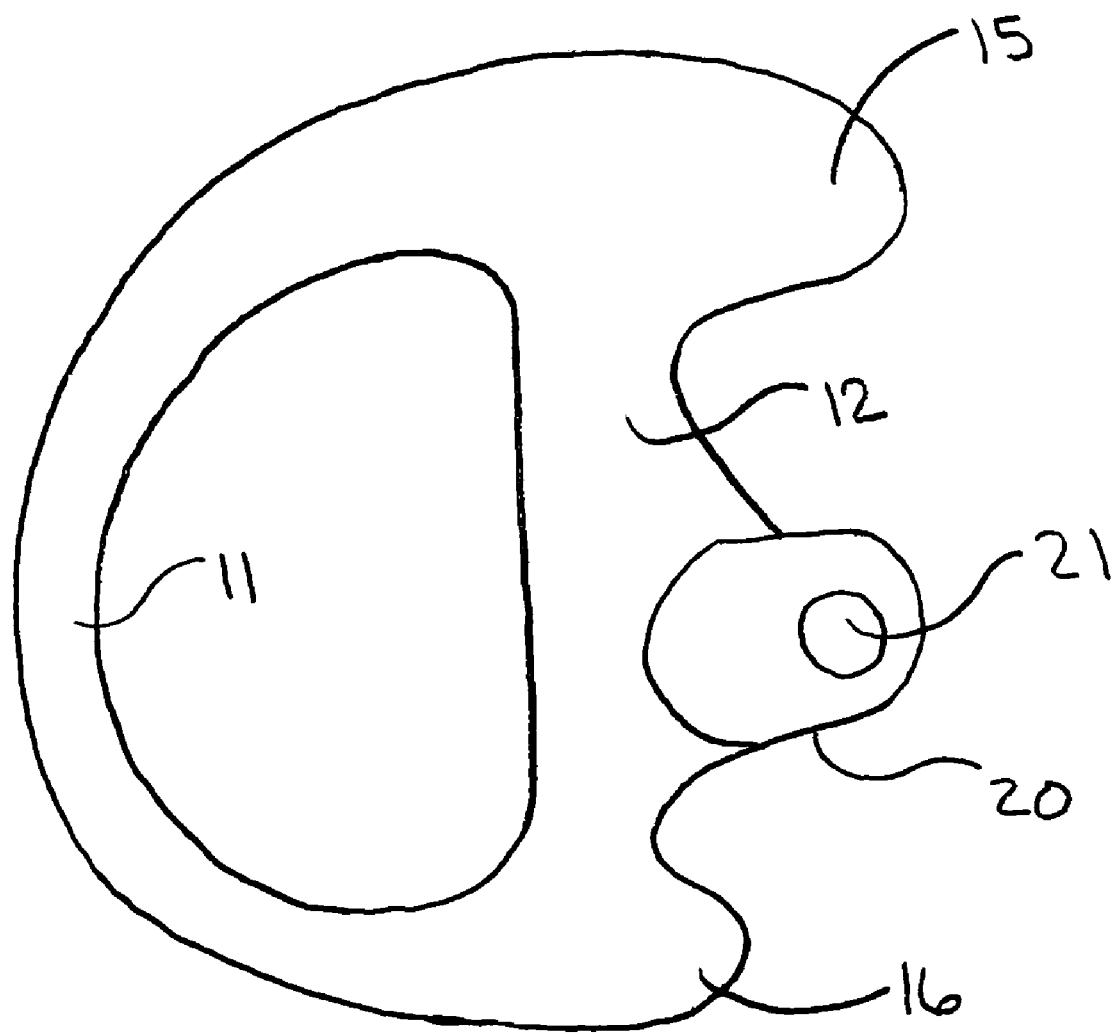
FIG. 1 is a side view of the inboard (toward the head) side of a contemporary left earpiece having a lower lobe (the opposite or outboard side being substantially the same as the inboard side, but lacking the protrusion that goes into the ear)

Referring now to FIG. 1, a contemporary earpiece comprises a generally arcuate rib 11 and a generally vertical rib 12. A top lobe 15 is formed at the top, near where the arcuate rib 11 and the generally vertical rib 12 intersect. Similarly, a bottom lobe 16 is formed at the bottom, near where the arcuate rib 11 and the generally vertical rib 12 intersect. A protrusion or stem 20 extends away from the vertical rib 12 and is configured to enter the ear canal. A bore 21 formed in the stem 20 transmits sound to a point proximate the eardrum. Acoustic tubing attaches to the earpiece such that a generally contiguous sound channel is formed by the acoustic tubing and bore 21.

As mentioned above, in many instances, the arcuate rib 11 can be too large for the conchae. In such instances arcuate rib 11 bends and thereby urges lower lobe 16 against the ear. The pressure of lower lobe 16 against the ear can cause discomfort. During extended wear, this generally constant pressure can become substantially painful. It can result in tissue damage that can cause further pain. Infection can even result.

It has previously been though that lower lobe 16 was necessary to maintain the earpiece securely within the wearer's ear. However, as discussed below, the present invention comprises an earpiece that lacks the lower lobe, yet remains securely within the wearer's ear.

Figure 2A:
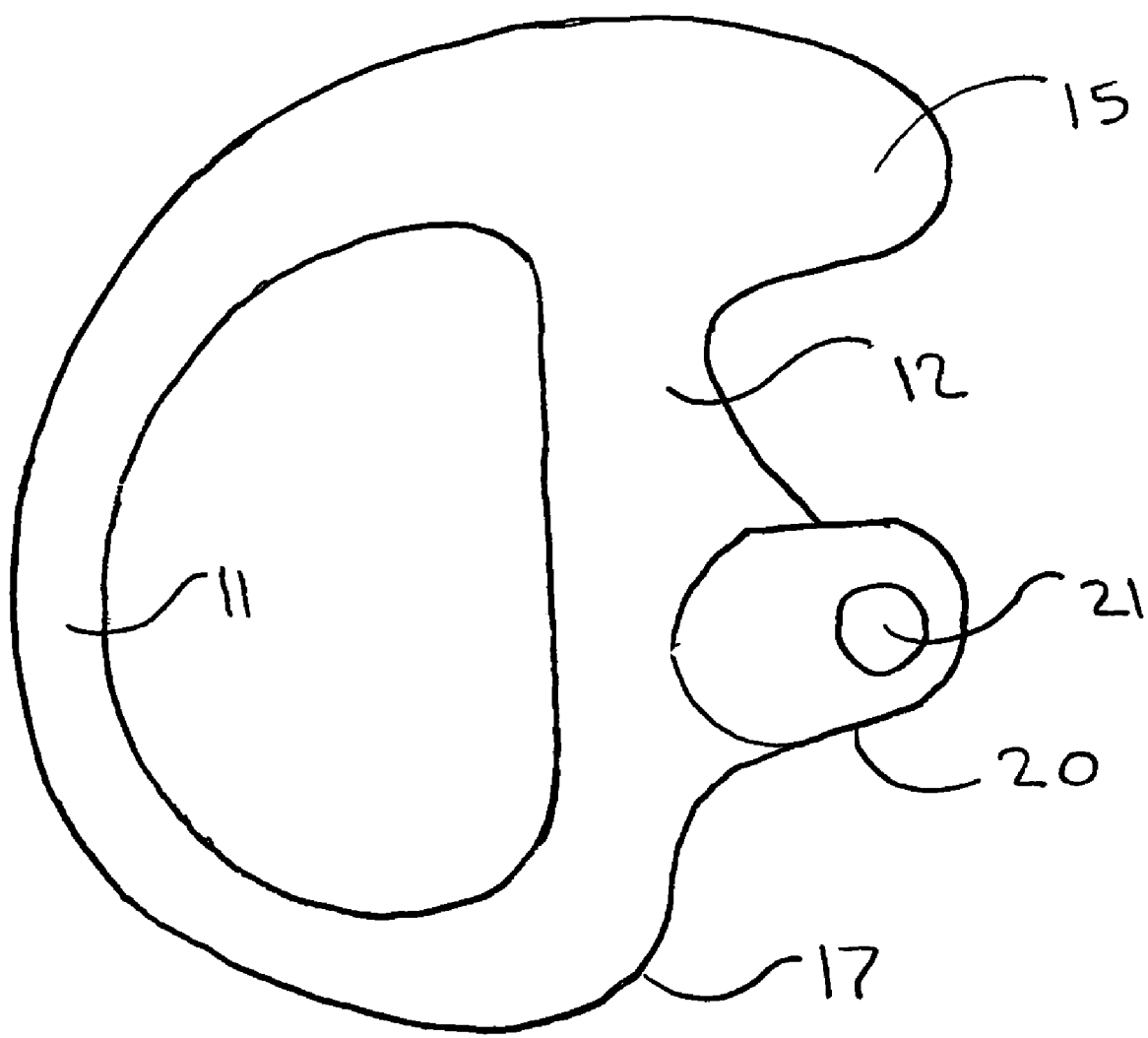
FIG. 2A is a side view of the inboard side of a left earpiece that has a smooth bend where the lower lobe of a contemporary earpiece is located, and thus substantially lacks the lower lobe, according to an exemplary embodiment of the present invention.
Figure 2B:
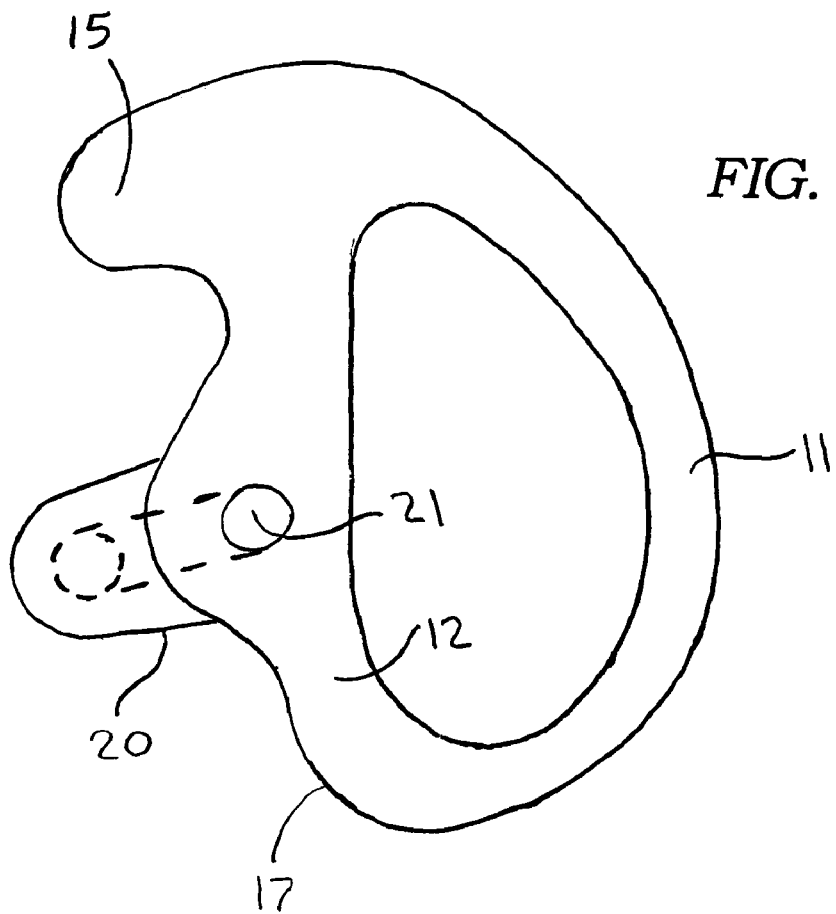
FIG. 2B is a side view of the outboard side of the left earpiece of FIG. 2A, showing the bore in dashed lines.
Figure 2C:
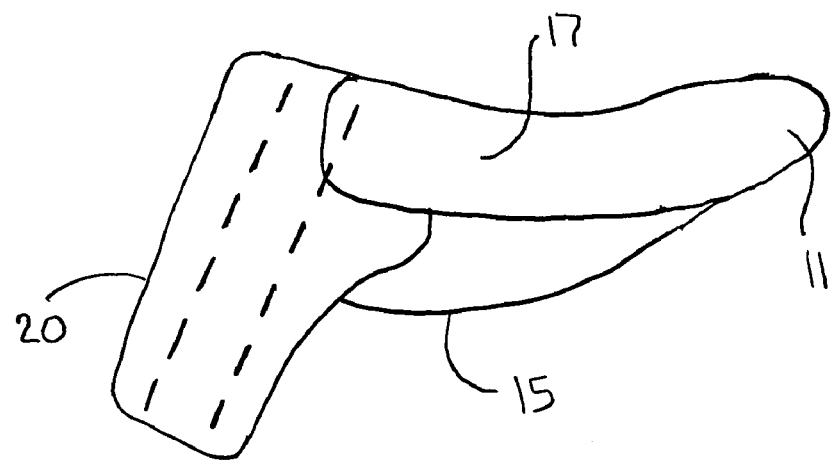
FIG. 2C is a bottom view of the left earpiece of FIG. 2A, showing the bore in dashed lines.

Referring now to FIGS. 2A-2C, according to one aspect of the present invention the lower lobe (such as lower lobe 16 of the contemporary earpiece of FIG. 1), is omitted. Rather, instead of such a lower lobe, a smooth rounded surface 17 is provided. The smooth rounded surface does not extend substantially away from the intersection of the arcuate rib 11 and the vertical rib 12 in the manner that a lobe does.

Since the earpiece of the present invention lacks such a lower lobe, it can be used in a substantially wider range of ear sizes without compromising comfort or safety in the way that a contemporary earpiece may. That is, a single size of earpiece may be used to fit more different sizes of ears.

When an earpiece of the present invention is used in an ear where the generally arcuate rib 11 is too large for the ear (does not fit within the conchae without substantial deformation), the generally arcuate rib merely bends or collapses without adverse affect. Since there is no lower lobe, there is consequently no rubbing and no cause of discomfort.

Thus, at least one embodiment of the present invention comprises an earpiece substantially lacking a lower lobe. The lower lobe can be eliminated altogether or partially. The earpiece can have a smooth bend instead the lower lobe of contemporary earpieces. In this manner, disadvantages associated with the lower lobe can be mitigated, while still providing an earpiece that functions as desired.

Thus, the earpiece can comprise a generally arcuate rib 11 having upper and lower ends, a generally vertical rib 12 extending substantially between the upper and lower ends, and a lobe 15 is formed at the upper end of the arcuate rib 11. A smooth bend 17 can be formed at the lower end of the arcuate rib 11. The earpiece can be configured to be generally shaped like a D. However, those skilled in the art will appreciate that other embodiments are likewise suitable. For example, either the vertical rib 12 or the arcuate rib 11 can be modified substantially or omitted.

The earpiece can further comprise a protrusion or stem 20 having a bore 21 formed therethrough. The protrusion 20 can be configured to extend at least partially into the ear canal. The bore can transmit sound, such as from a two-way radio to the wearer's eardrum.

The earpiece can be formed of a resilient polymer. For example, the earpiece can be formed of a resilient polymer having a Shore A durometer of between 35 and 45. More particularly, the earpiece can be formed of a resilient polymer having a Shore A durometer of approximately 40. Alternatively, the earpiece can be formed of a more rigid material.

The earpiece can be configured to be captured by protrusions of the conchae. For example, the earpiece can be configured to be captured at least partially by the antihelix of the ear and/or other anatomical structures of the ear that are proximate or within the conchae bowl. In this manner, the earpiece is held securely in place during use.

The generally arcuate rib 11 can bend to accommodate a wide range of ear sizes. For example, the generally arcuate rib 11 can collapse so as to accommodate a range of ear sizes. Such collapsing of the earpiece is made substantially more comfortable by the lack or partial lack of the lower lobe. That is, as the generally arcuate rib 11 collapses, there is no lower lobe or not enough lower lobe to torque, twist, bend, or otherwise move or deform in a manner that can cause discomfort.

One embodiment of the earpiece can be configured to fit at least extra large sized ears. Similarly, one embodiment of the earpiece can be configured to fit at least extra large sized ears and a large sized ears. Moreover, a single embodiment of the earpiece can configured to fit most adult ears. For example, the earpiece can be configured to fit at least 70% of ears of men between 19 and 40 years old. Bending of the vertical rib and lack of the lower lobe cooperate to facilitate the fitting of such a large range of sizes.

According to one embodiment, the present invention comprises a portable communication system comprising a radio and also comprising an earpiece having a smooth bend instead of a lower lobe, as described above. Further, the earpiece of the present invention can be used in applications other than security, law enforcement and military application. For example, the earpiece of the present invention can be used with cellular telephone and portable music devices (such as CD player and MP3 players). A speaker can be in acoustic communication with the bore of the earpiece via acoustic tubing or the like. Alternatively, a speaker can be attached directly to the earpiece, such as by mounting the speaker to the earpiece or by placing the speaking inside or partially inside of the earpiece.

The earpiece can also be used as a sound attenuating earplug, such as by configuring the protrusion to seal or partially seal the ear. Alternatively, a member that seal or partially seals the ear can be added to the earpiece.

Thus, according to at least one embodiment of the present invention, an earpiece is provided that is substantially more comfortable to wear. Because it is more comfortable to wear, there is less tendency for a wearer to remove of manipulate (such as adjusting to try to make more comfortable). Thus, the wearer is less likely to be distracted by the earpiece. This can be important, particularly in security, law enforcement, and military applications were distraction can endanger the wearer's life.

Since less material is used (because a portion of the earpiece is reduced in size or eliminated), the earpiece can be less expensive to manufacture. Since such earpieces are frequently purchase in bulk, such as by police departments and the military, such cost savings can be substantial.

Further, since a single earpiece fits a greater range of ear sizes, fewer earpieces need to be inventoried by law enforcement departments and the like. Such reduction in inventory may save such agencies substantial money.

Figure 3:
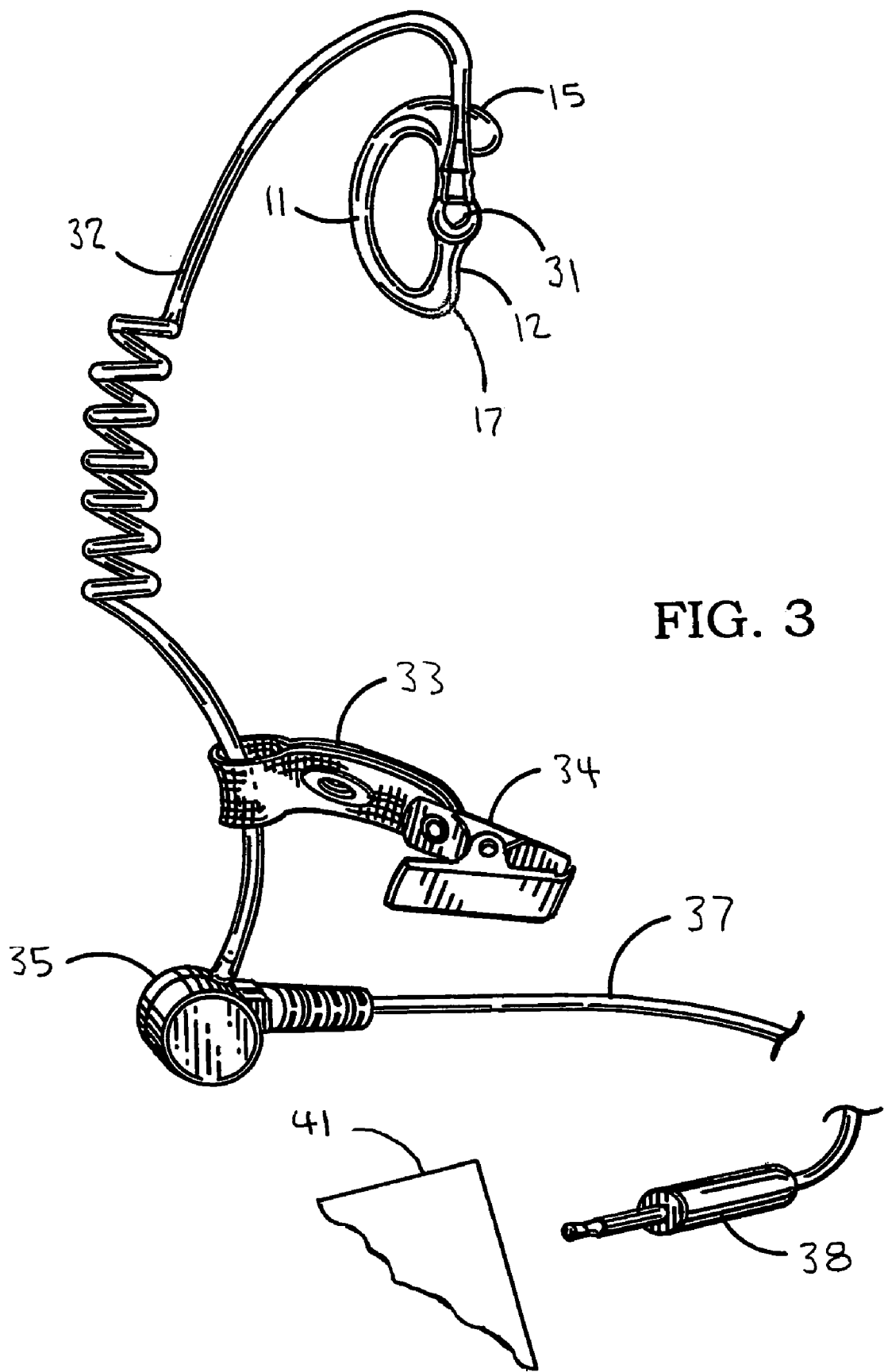
FIG. 3 is a perspective view of the earpiece of FIGS. 2A-2C attached to acoustic tubing via a barbed fitting, having a speaker also attached to the acoustic tubing, the speaker having a plug for attachment to a two-way radio, according to an exemplary embodiment of the present invention.

Referring now to FIG. 3, the earpiece of the present invention can be attached to acoustic tubing 32, such as via a barbed fitting 31. A strap 33 can be used to secure acoustic tubing 32 to a wearer's clothing, such as via a clip 34. A speaker 35 converts electrical signals received via electrical cable 37 from a two-way radio 41 into sound that is transmitted to the eardrum via acoustic tubing 32 and via bore 21 (FIGS. 2A-2C) of the earpiece. A plug 38 can be used to connect electrical cable 37 to two-way radio 41.

One or more embodiments of the present invention provide an earpiece that is more comfortable, less costly, easier to inventory, and yet effective for use according to its intended purpose.

The invention claimed is:

1. An earpiece comprising:
a generally arcuate rib having upper and lower ends;
a generally vertical rib extending substantially between the upper and lower ends of the arcuate rib;
a lobe formed at the upper end of the arcuate rib and extending therefrom; and
wherein no lobe is formed at the lower end of the arcuate rib.

2. The earpiece as recited in claim 1, wherein the generally arcuate rib bends to accommodate a range of ear sizes.

3. The earpiece as recited in claim 1, wherein the generally arcuate rib collapses to accommodate a range of ear sizes.

4. The earpiece as recited in claim 1, wherein the earpiece is configured to be captured by protrusions of the conchae.

5. The earpiece as recited in claim 1, wherein the earpiece is configure to be captured at least partially by the antihelix of the ear.

6. The earpiece as recited in claim 1, wherein the earpiece is configured to fit at least an extra large size of ears.

7. The earpiece as recited in claim 1, wherein the earpiece is configured to fit both an extra large size of ears and a large size of ears.

8. The earpiece as recited in claim 1, wherein the earpiece is configured to fit most adult ears.

9. The earpiece as recited in claim 1, wherein the earpiece is configured to fit at least 70% of ears of men between 19 and 40 years old.

10. The earpiece as recited in claim 1, wherein the earpiece is configured to be generally shaped like a D.

11. The earpiece as recited in claim 1, wherein the earpiece further comprises a protrusion having a bore formed therethrough, the protrusion being configured to extend at least partially into the ear canal.

12. The earpiece as recited in claim 1, wherein the earpiece is formed of a resilient polymer.

13. The earpiece as recited in claim 1, wherein the earpiece is formed of a resilient polymer having a Shore A durometer of between 35 and 45.

14. The earpiece as recited in claim 1, wherein the earpiece is formed of a resilient polymer having a Shore A durometer of approximately 40.

15. The earpiece as recited in claim 1, wherein the arcuate rib is collapsible from the upper and to the lower ends.

16. A portable communication system comprising:
a radio;
an earpiece, the earpiece comprising:
a generally arcuate rib having upper and lower ends;
a generally vertical rib extending substantially between the upper and lower ends of the arcuate rib;
a lobe formed at the upper end of the arcuate rib and extending therefrom; and
wherein no lobe is formed at the lower end of the arcuate rib.

17. The portable communication system as recited in claim 16, wherein the generally arcuate rib bends to accommodate a range of ear sizes.

18. The portable communication system as recited in claim 16, wherein the generally arcuate rib collapses to accommodate a range of ear sizes.

19. The portable communication system as recited in claim 16, wherein the earpiece is configured to be captured by protrusions of the conchae.

20. The portable communication system as recited in claim 16, wherein the earpiece is configure to be captured at least partially by the antihelix of the ear.

21. The portable communication system as recited in claim 16, wherein the earpiece is configured to fit at least an extra large size of ears.

22. The portable communication system as recited in claim 16, wherein the earpiece is configured to fit both an extra large size of ears and a large size of ears.

23. The portable communication system as recited in claim 16, wherein the earpiece is configured to fit most adult ears.

24. The portable communication system as recited in claim 16, wherein the earpiece is configured to fit at least 70% of ears of men between 19 and 40 years old.

25. The portable communication system as recited in claim 16, wherein the earpiece is configured to be generally shaped like a D.

26. The portable communication system as recited in claim 16, wherein the earpiece further comprises a protrusion having a bore formed therethrough, the protrusion being configured to extend at least partially into the ear canal.

27. The portable communication system as recited in claim 16, wherein the earpiece is fowled of a resilient polymer.

28. The portable communication system as recited in claim 16, wherein the earpiece is formed of a resilient polymer having a Shore A durometer of between 35 and 45.

29. The portable communication system as recited in claim 16, wherein the earpiece is formed of a resilient polymer having a Shore A durometer of approximately 40.

\* \* \* \* \*

UNITED STATES PATENT AND TRADEMARK OFFICE
CERTIFICATE OF CORRECTION

PATENT NO. : 7,778,435 B2  Page 1 of 1
APPLICATION NO. : 11/236969
DATED : August 17, 2010
INVENTOR(S) : Richard C. Smith and Diann Y. Smith It is certified that error appears in the above-identified patent and that said Letters Patent is hereby corrected as shown below:

In column 1, line 57, change "there" to -- their --.

In column 2, line 43, after "can" insert -- be --.

In column 5, line 6, change "fowled" to -- formed --.

In column 5, line 7, change "seal" to -- seals --.

In column 5, line 12, change "of" to -- or --.

In column 5, line 16, change "were" to -- where --.

Claim 5, column 5, line 56, change "configure" to -- configured --.

Claim 15, column 6, line 16, change "and" to -- end --.

Claim 20, column 6, line 37, change "configure" to -- configured --.

Signed and Sealed this

Seventh Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,778,435 B2 | Page 1 of 1 |
| APPLICATION NO. | : 11/236969 | |
| DATED | : August 17, 2010 | |
| INVENTOR(S) | : Richard C. Smith and Diann Y. Smith | |

It is certified that error appears in the above-identified patent and that said Letters Patent is hereby corrected as shown below:

In column 1, line 57, change "there" to -- their --.

In column 2, line 43, after "can" insert -- be --.

In column 5, line 7, change "seal" to -- seals --.

In column 5, line 12, change "of" to -- or --.

In column 5, line 16, change "were" to -- where --.

Claim 5, column 5, line 56, change "configure" to -- configured --.

Claim 15, column 6, line 16, change "and" to -- end --.

Claim 15, column 6, line 16, change "ends" to -- end --.

Claim 20, column 6, line 37, change "configure" to -- configured --.

Claim 27, Column 6, line 59, change "fowled" to -- formed --.

This certificate supersedes the Certificate of Correction issued December 7, 2010.

Signed and Sealed this
Twenty-first Day of June, 2011

David J. Kappos
*Director of the United States Patent and Trademark Office*